Nov. 8, 1938.  G. E. PETTY  2,136,265
CONSTRUCTION OF WINGS, SURFACES, AND FUSELAGES FOR AIRCRAFT
Filed Oct. 11, 1937  2 Sheets-Sheet 2

Patented Nov. 8, 1938

2,136,265

UNITED STATES PATENT OFFICE 2,136,265

CONSTRUCTION OF WINGS, SURFACES, AND FUSELAGES FOR AIRCRAFT

George Edward Petty, Brough, near Hull, England, assignor to Blackburn Aircraft Limited, Brough, near Hull, England Application October 11, 1937, Serial No. 168,468
In Great Britain October 12, 1936

8 Claims. (Cl. 244—123)

This invention relates to the construction of wings, control surfaces and fuselages (hereinafter referred to as aircraft bodies) for aircraft.

The object of the present invention is to provide an improved construction of aircraft bodies of the type which comprises a stressed skin formed of thin sheet material such as thin metal attached to tubular members by riveting.

According to this invention, in an aircraft body, spanwise or longitudinal tubular members of constant external diameter but of diminishing gauge from one end to the other are used. The tubular members are arranged to conform with the contour of the wing or other part and the external cover formed of thin sheet material, such as thin sheet metal, contacts with the tubes to which it is attached by riveting or other convenient means.

In an aircraft body composed of a plurality of spanwise or longitudinal tubular members arranged to conform to the contour of the aircraft body and an external cover formed of sheet material which contacts with the tubes to which it is attached by riveting or by other convenient means, the required contour is determined and maintained by transverse ribs or formers which define the position of the tubular members at various locations and also form interconnections between the tubes on opposite sides of the structure.

The opposed tubes, therefore, form the booms of successive girders for taking the vertical loads, while the skin is stressed to resist torsional loads imposed on the wing by the ailerons and by changing the centre of pressure throughout the wing.

In a preferred construction of aircraft body such as above described, the gauge of the tubes is reduced gradually from one end to the other.

A form of construction of a stressed skin wing is shown, by way of example, in the accompanying drawings, in which—

Figure 1:
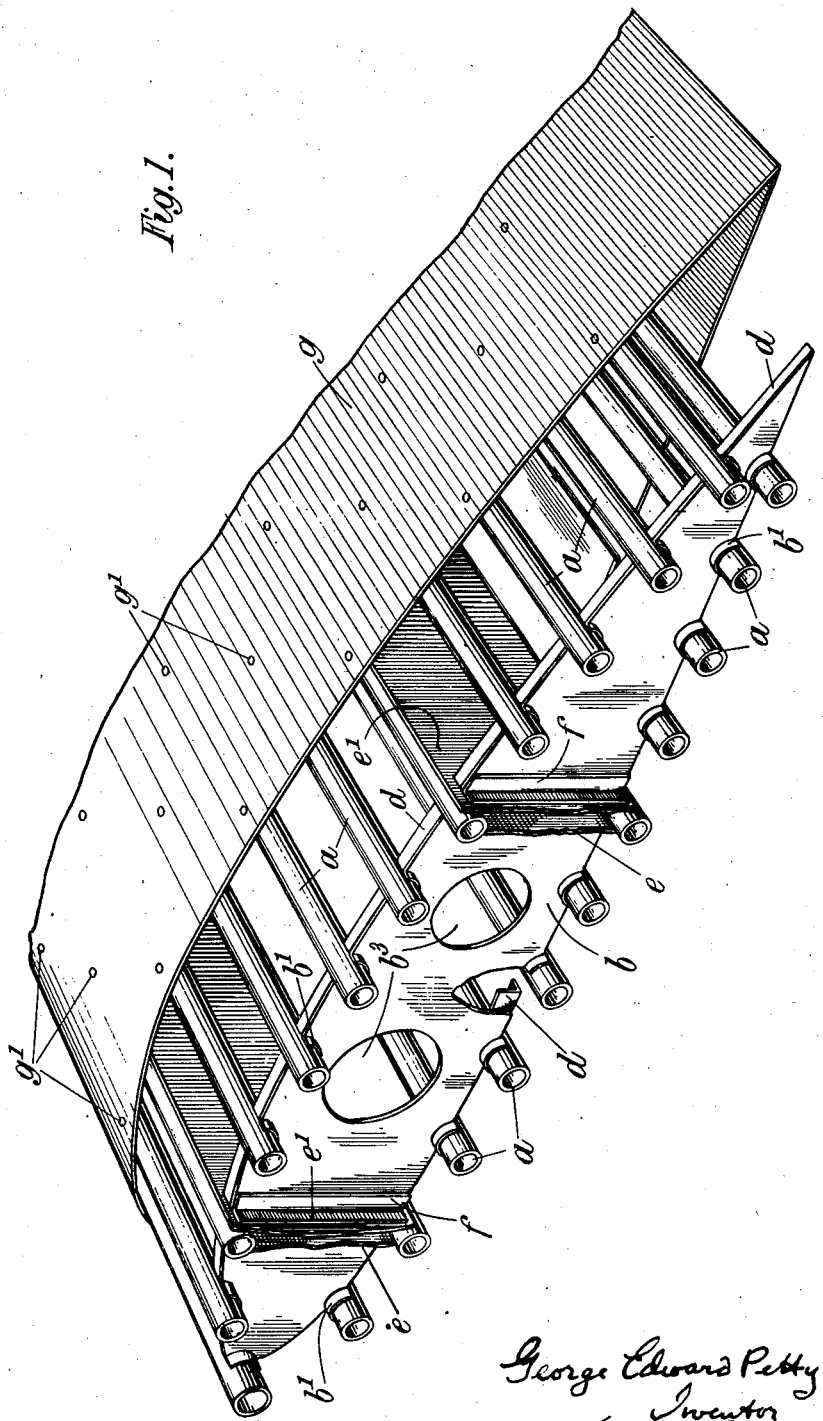
Fig. 1 is a perspective view of part of the wing showing the covering partly removed.
Figure 2:
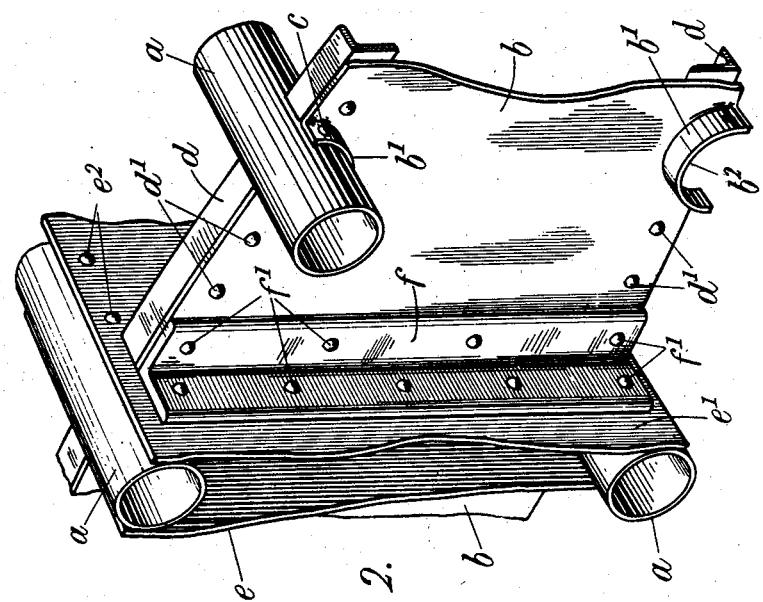
Fig. 2 is an enlarged perspective view of one pair of upper and lower tubes, with plate webs attached to them and showing the method of attaching the transverse rib to the webs.
Figure 3:
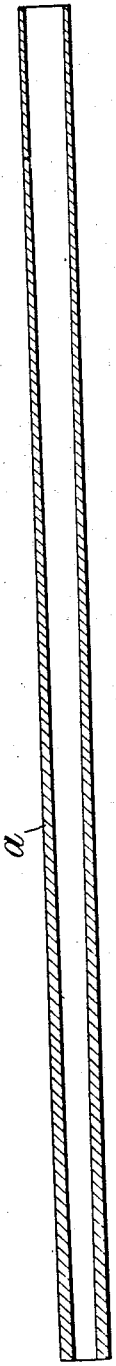
Fig. 3 is a longitudinal section illustrating diagrammatically the form of the tubular member.

As shown, the wing is constructed of a series of spanwise tubes $a$ of constant external diameter but of diminishing gauge from the root to the tip, the bore diverging outwards slightly from the root to the tip as shown in Fig. 3, in which the diameter and gauge of the tube is enlarged relative to the length of the tube for convenience of illustration. These tubes are arranged in such positions that their extreme upper and lower parts conform with the contour of the wing. The tubes $a$ are positioned by transverse ribs comprising sheet metal plates $b$ shaped so that their edges are equi-distant from the contour at all points, said plates being formed with pressed out flanges $b^1$ of semi-circular shape, having semi-circular recesses $b^2$, which flanges and recesses receive the tubes $a$ which are fixed to the flanges by rivets $c$. The plates $b$ are stiffened at their edges by angle sections $d$ which have one of their flanges attached to the plate by rivets $d^1$ while the other extends outwardly at right angles thereto. These angle sections extend between each adjacent pair of tubes. Lightening holes $b^3$ may be formed in the plates $b$.

As shown, two of the upper tubes are connected to two of the lower tubes by web plates $e$, $e^1$ located one at each side of the tubes to which they are attached by rivets $e^2$. These web plates extend with the tubes without break from root to tip, the transverse ribs being divided where the web plates extend through them and the divided rib plates $b$ are attached to the web plates by angle members $f$ and rivets $f^1$.

Around the tubes $a$ so located the sheet metal covering $g$ is laid, said covering being attached to the tubes by rivets indicated at $g^1$.

The advantage obtained by using constant external diameter tubes of varying gauge is that it enables the tubes to be graduated to suit loading conditions while maintaining the tubes as near as possible to the contour and in the most advantageous position for resisting the vertical loads. For instance, the use of such tubes to form the top and bottom booms of a beam on cantilever monoplanes enables the scantlings of the tubes to be reduced progressively towards the wing tip with a great saving in weight.

By maintaining the outer diameter of the tubes $a$ constant and gradually tapering the tubes internally the cover $g$ can be attached directly to the tubular members and also a "dolly" may be inserted from one end of the tube and the riveting of the skin $g$ and also the web plates $e$, $e^1$ to the tubes $a$ may be done from the outside. This cannot be done if the reduction of gauge of the tube in accordance with loading condition were secured by using short lengths of different gauge connected together by sockets or sleeves, because these would obstruct the "dolly."

What I claim as my invention and desire to secure by Letters Patent is:

1. An aircraft body comprising, in combination, a plurality of tubular members extending longitudinally of the said body, said tubular members being of constant external size but of diminishing gauge from one end to the other, transverse formers having peripheral recesses therein shaped partly to receive the tubular members and define and maintain them in positions in which they project proud of the formers and with their outer borders shaped to conform to a required contour of the aircraft body, said formers also forming interconnections between the tubular members at opposite sides of the body, an external cover of sheet material surrounding the tubular members (having line contact with each of the tubular members) whereby the cover is shaped by the tubular members and means for attaching said cover to said tubular members.

2. An aircraft body comprising, in combination, a plurality of tubular members extending longitudinally of the said body of constant external diameter but of diminishing gauge from one end to the other, transverse formers having peripheral recesses therein shaped partly to receive the tubular members and define and maintain them in positions in which they project proud of the formers and with their outer borders shaped to conform to a required contour of the aircraft body, said formers also forming interconnections between tubular members at opposite sides of the body, an external cover of sheet material surrounding the tubular members having line contact with each of the tubular members whereby the cover is shaped by the tubular members and means for attaching said cover to said tubular members.

3. An aircraft body comprising, in combination, a series of tubular members extending longitudinally of the said body, sheet metal formers arranged transversely of the tubular members having recesses in their borders partially to receive the tubular members whereby the formers define and maintain the tubular members in positions in which they project proud of the said borders of the formers and with their outermost parts conforming to the aircraft body contour, said formers interconnecting the tubular members on opposite sides of the body, an external cover of sheet material surrounding the tubular members and contacting with the tubular members and means for attaching said cover to the said tubular members.

4. An aircraft body comprising a series of tubular members extending longitudinally of the said body of constant external diameter but of diminishing gauge from one end to the other, sheet metal formers arranged transversely of the tubular members having recesses in their borders partially to receive the tubular members (and having outstanding flanges around the recesses which flanges are shaped to fit the tubular members), whereby the formers define and maintain the tubular members in positions in which they project proud of the said borders of the formers and with their outermost parts conforming to the aircraft body contour, said formers interconnecting the tubular members on opposite sides of the body, an external cover of sheet material surrounding the tubular members and contacting with the tubular members and means for attaching said cover to the said tubular members.

5. An aircraft body comprising a series of tubular members extending longitudinally of the said body of constant external diameter but of diminishing gauge from one end to the other, sheet metal formers arranged transversely of the tubular members having recesses in their borders partially to receive the tubular members, angle members extending around the borders of the said formers having one of their flanges attached to the former and having the other of their flanges extending outwardly at right angles thereto, said angle members extending between each adjacent pair of tubular members, whereby the formers define and maintain the tubular members in positions in which they project proud of the said borders of the formers and with their outermost parts conforming to the aircraft body contour, said formers interconnecting the tubular members on opposite sides of the body, an external cover of sheet material surrounding the tubular members and contacting with the tubular members and means for attaching said cover to the said tubular members.

6. An aerofoil body comprising a series of tubular members extending longitudinally of the said body of constant external diameter but of diminishing gauge from one end to the other, a web interconnecting at least one pair of upper and lower tubular members, sheet metal formers arranged transversely of the tubular members having recesses in their borders partially to receive the tubular members whereby the formers define and maintain the tubular members in positions in which they project proud of the said borders of the formers and with their outermost parts conforming to the aircraft body contour, said formers interconnecting the tubular members on opposite sides of the body, an external cover of sheet material surrounding the tubular members and contacting with the tubular members and means for attaching said cover to the said tubular members.

7. An aerofoil body comprising a series of tubular members extending longitudinally of the said body of constant external diameter but of diminishing gauge from one end to the other, a plate web extending between at least one tubular member on the upper surface and one tubular member on the lower surface, attached to the said tubular members and extending without break from root to tip of the wing, sheet metal formers arranged transversely of the tubular members and being divided where they pass the said web, said formers having recesses in their borders partially to receive the tubular members and means for attaching said formers to the said web, whereby the formers define and maintain the tubular members in positions in which they project proud of the said borders of the formers and with their outermost parts conforming to the aircraft body contour, said formers interconnecting the tubular members on opposite sides of the body, an external cover of sheet material surrounding the tubular members and contacting with the tubular members and means for attaching said cover to the said tubular members.

8. An aerofoil body comprising a series of tubular members extending longitudinally of the said body of constant external diameter but of diminishing gauge from one end to the other, a web interconnecting at least one pair of opposed tubular members and extending without break from root to tip of the body, sheet metal formers arranged transversely of the tubular members having recesses in their borders partially to receive the tubular members, angle members extending around the borders of the said formers having one of their flanges attached to the former and having the other of their flanges extending outwardly at right angles thereto, said angle members extending between each adjacent pair of tubular members, whereby the formers define and maintain the tubular members in positions in which they project proud of the said borders of the formers and with their outermost parts conforming to the aircraft body contour, said formers interconnecting the tubular members on opposite sides of the body, an external cover of sheet material surrounding the tubular members and contacting with the tubular members and means for attaching said cover to the said tubular members.

GEORGE EDWARD PETTY.